US007773732B2

(12) United States Patent
Gesquiere et al.

(10) Patent No.: US 7,773,732 B2
(45) Date of Patent: Aug. 10, 2010

(54) DSL MODEM AND METHOD FOR ESTABLISHING A DATA TRANSFER MODE THEREFORE

(75) Inventors: Lieven Gesquiere, Bornem (BE); Stan Claes, Mechelen (BE); Dirk Van De Poel, Antwerp (BE)

(73) Assignee: Thomson Licensing, Boulonge-Billancourt (FR)

( * ) Notice: Subject to any disclaimer, the term of this patent is extended or adjusted under 35 U.S.C. 154(b) by 1280 days.

(21) Appl. No.: 10/516,711

(22) PCT Filed: May 28, 2003

(86) PCT No.: PCT/EP03/50206

§ 371 (c)(1), (2), (4) Date: Dec. 2, 2004

(87) PCT Pub. No.: WO03/102793

PCT Pub. Date: Dec. 11, 2003

(65) Prior Publication Data

US 2006/0075159 A1 Apr. 6, 2006

(30) Foreign Application Priority Data

Jun. 3, 2002 (EP) ................................. 02447103

(51) Int. Cl.
*H04B 7/00* (2006.01)

(52) U.S. Cl. .............................. 379/93.01; 379/413.02

(58) Field of Classification Search ................. 379/413, 379/63.01, 93.05, 93.06, 93.08, 93.09, 413.029; 710/29, 36, 31, 32, 33, 61

See application file for complete search history.

(56) References Cited

U.S. PATENT DOCUMENTS

| | | | | |
|---|---|---|---|---|
| 6,021,129 | A * | 2/2000 | Martin et al. | 370/395.72 |
| 6,157,975 | A * | 12/2000 | Brief et al. | 710/104 |
| 6,408,351 | B1 * | 6/2002 | Hamdi et al. | 710/63 |
| 6,523,081 | B1 * | 2/2003 | Karlsson et al. | 710/305 |
| 6,590,865 | B1 * | 7/2003 | Ibaraki et al. | 370/230 |
| 6,590,897 | B1 * | 7/2003 | Lauffenburger et al. | 370/395.6 |
| 6,658,499 | B1 * | 12/2003 | Day et al. | 710/8 |
| 7,215,670 | B1 * | 5/2007 | Karlsson et al. | 370/395.1 |
| 7,230,975 | B2 * | 6/2007 | Subrahmanya et al. | 375/148 |
| 2003/0023717 | A1 * | 1/2003 | Lister | 709/224 |
| 2003/0117963 | A1 * | 6/2003 | Wang | 370/252 |

FOREIGN PATENT DOCUMENTS

| | | |
|---|---|---|
| EP | 1102171 | 5/2001 |

* cited by examiner

*Primary Examiner*—Fan Tsang
*Assistant Examiner*—Akelaw A Teshale
(74) *Attorney, Agent, or Firm*—Robert D. Shedd; Robert B. Levy; Jeffrey D. Hale

(57) ABSTRACT

A modem for interconnecting a DSL line and a local bus comprises a DSL interface adapted to send and receive data on the DSL line at a DSL bandwidth selected from a first set of bandwidths, and a local bus interface adapted to operate at a local bus bandwidth selected from a second set of bandwidths so as to match the DSL bandwidth. In a first operating mode, the modem reserves as much as possible of a predetermined local bus bandwidth and then synchronizes the DSL line to a matching mode. In a second operating mode, the modem synchronizes the DSL line to a predetermined bandwidth and then reserves a matching local bus bandwidth or, if impossible, adopts a bulk transfer mode.

17 Claims, 3 Drawing Sheets

Personal Computer 5
USB Interface 8
DSL Interface 7
DSL line 3
Remote Service Provider 2
Memory 9
Modem 1
USB bus 4
Peripheral Device 6

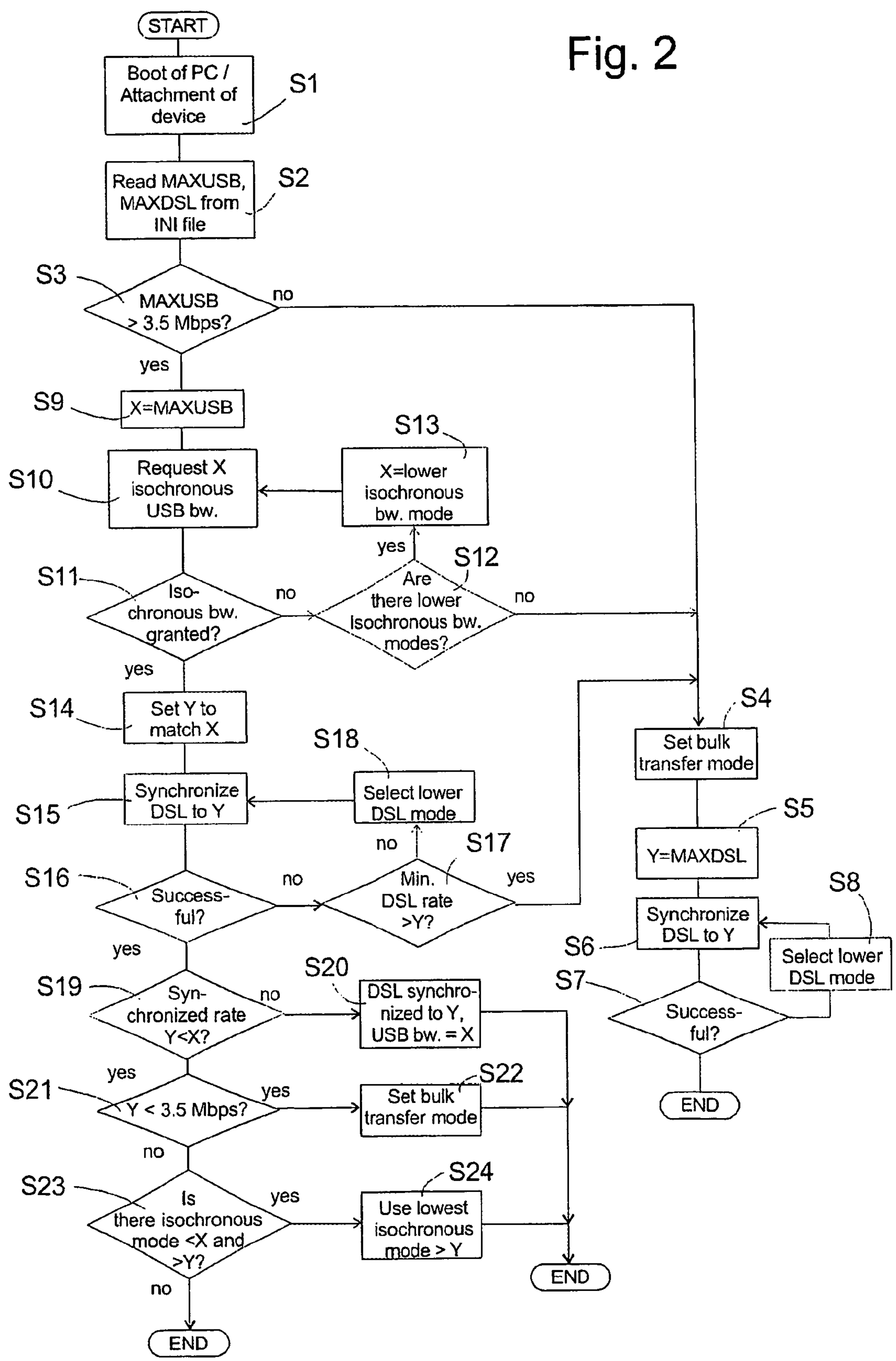

Fig. 2
START
Boot of PC / Attachment of device
S1
Read MAXUSB, MAXDSL from INI file
S2
S3
MAXUSB > 3.5 Mbps?
no
yes
S9
X=MAXUSB
S13
S10
Request X isochronous USB bw.
X=lower isochronous bw. mode
yes
S12
S11
Iso-chronous bw. granted?
no
Are there lower Isochronous bw. modes?
no
yes
S4
S14
Set Y to match X
S18
Set bulk transfer mode
Synchronize DSL to Y
Select lower DSL mode
S5
S15
no
S17
S16
Y=MAXDSL
no
Min. DSL rate >Y?
yes
Success-ful?
S8
Synchronize DSL to Y
yes
S6
Select lower DSL mode
S20
S7
S19
Syn-chronized rate Y<X?
no
DSL synchro-nized to Y, USB bw. = X
Success-ful?
yes
S22
S21
yes
Y < 3.5 Mbps?
Set bulk transfer mode
END
no
S24
S23
Is there isochronous mode <X and >Y?
yes
Use lowest isochronous mode > Y
END
no
END

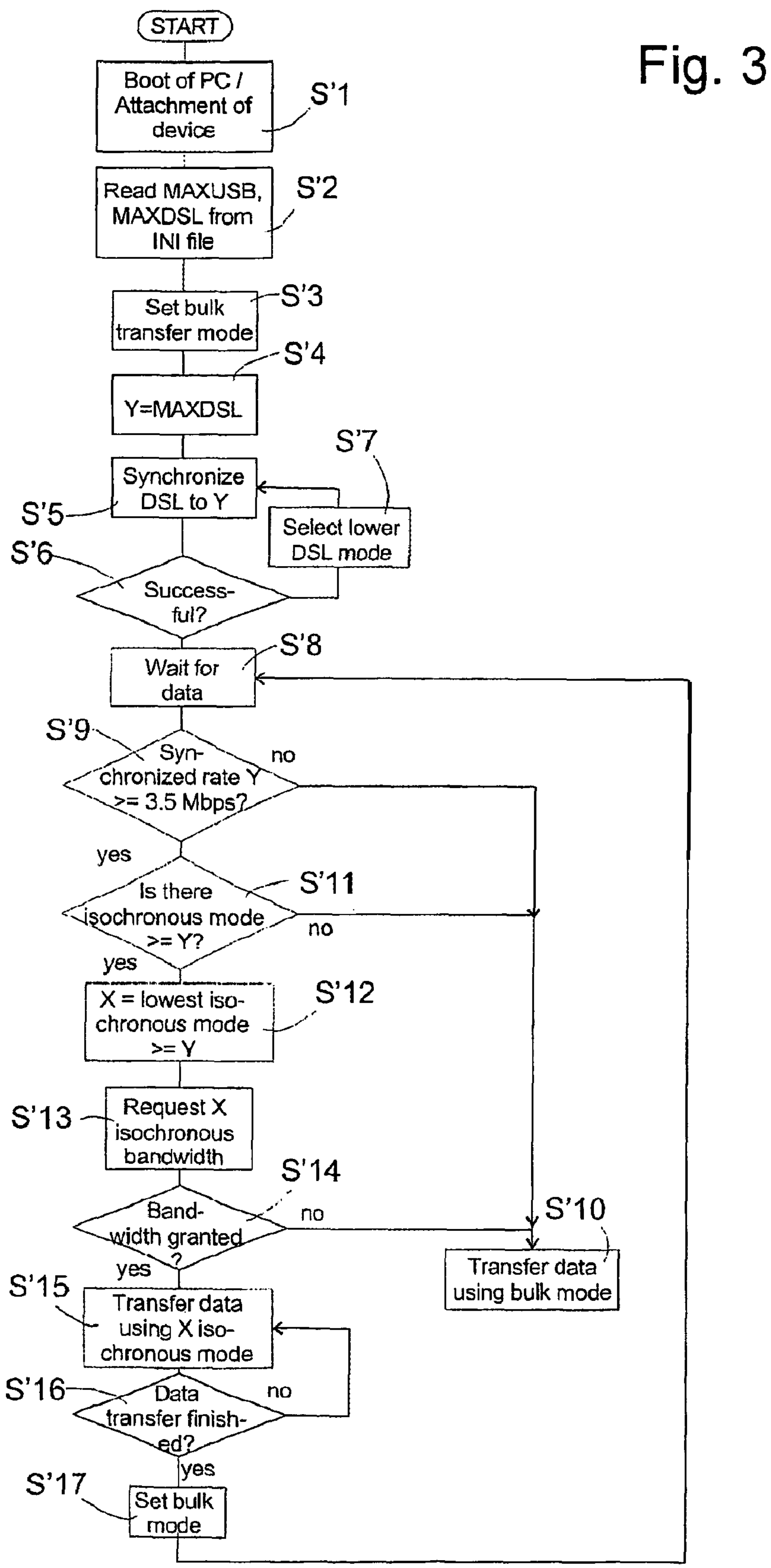
Fig. 3
START
Boot of PC / Attachment of device
S'1
Read MAXUSB, MAXDSL from INI file
S'2
Set bulk transfer mode
S'3
Y=MAXDSL
S'4
Synchronize DSL to Y
S'5
S'6
Success-ful?
Select lower DSL mode
S'7
Wait for data
S'8
S'9
Syn-chronized rate Y >= 3.5 Mbps?
no
yes
Is there isochronous mode >= Y?
S'11
no
yes
X = lowest iso-chronous mode >= Y
S'12
S'13
Request X isochronous bandwidth
S'14
Band-width granted ?
no
yes
S'10
Transfer data using bulk mode
S'15
Transfer data using X iso-chronous mode
S'16
Data transfer finish-ed?
no
yes
S'17
Set bulk mode

DSL MODEM AND METHOD FOR ESTABLISHING A DATA TRANSFER MODE THEREFORE

This application claims the benefit, under 35 U.S.C. §365 of International Application PCT/EP03/50206, filed May 28, 2003, which was published in accordance with PCT Article 21(2) on Dec. 11, 2003 in English and which claims the benefit of European patent application No. 02447103.9, filed Jun. 3, 2002.

FIELD OF THE INVENTION

The present invention relates to a system and a method for determining a data transfer mode for a DSL (for Digital Subscriber Line) modem, notably for USB bus (for Universal Serial Bus) and DSL line communications.

DESCRIPTION OF RELATED ART

DSL technology allows high bit-rate data transfer over a classic POTS (for Plain Old Telephone Service) twisted pair cable. Asymmetrical DSL (ADSL) provides up to 8 Mbps downstream and 800 kbps upstream data-rates.

Digital subscriber lines need both a modulation and demodulation (modem) unit at the service provider site and at the customer premises site. During DSL connection set-up, both sites synchronize via a negotiation mechanism to determine the connection parameters, including the DSL upstream and downstream bit-rates. So, bit-rates are not a priori fixed by the service provider but are dynamically determined during DSL synchronization.

DSL modems at the customer premises are typically connected to one personal computer (but may be connected to game consoles, set top boxes . . . ). Most common connection types are Ethernet (IEEE 802.3) and Universal Serial Bus (USB).

Universal Serial Bus Revision 1.1 is a serial bus interface that allows connecting up to 127 devices to one bus, and supports data transfer rates of up to 12 Mbps.

Every device connected to a USB bus, can choose one of two data transfer modes:

1) Bulk transfer mode. Bulk transfers are non-periodic, large bursty communication typically used for a transfer that can use any available bandwidth and can also be delayed until bandwidth is available. So bulk transfer mode has no guaranteed bandwidth on the bus, but uses any available bandwidth. It also has guaranteed errorless delivery of data over the USB bus via retransmission in case of errors.

2) Isochronous transfer mode. Isochronous transfers are used when working with isochronous data. Isochronous transfers provide periodic, continuous communication between host and device. Isochronous transfer mode uses an amount of guaranteed bandwidth on the USB bus. If the bandwidth request is granted by the USB controller, this bandwidth is guaranteed and not available to other devices on that USB bus.

Choice of transfer mode is usually done by selecting one of a limited set of configurations (alternate settings) for the USB interface. Each configuration set defines a transfer mode and a size of USB packets for that configuration. In case of isochronous transfer mode, the size of USB packets determines the isochronous bandwidth that is requested/used for the continuous data communication. Bulk transfer mode uses any bandwidth that may be available and does not send continuous USB data packets.

One of the typical features of a USB bus is "hot" plug-in of devices, which means devices can be connected and disconnected without powering off the personal computer. This results in a very dynamic bus configuration with relation to bandwidth distribution between connected devices. Devices that select isochronous transfer mode reserve bandwidth and make it no longer available to other devices. Devices that select bulk transfer mode only use bandwidth when there is data transfer but do not know in advance if there will be bandwidth available on the bus.

DSL bandwidth is determined during DSL line synchronization, so may vary according to the service level agreement or a number of DSL line specificities. The DSL modem at the customer premises receives beforehand minimum and maximum bandwidth parameters from the service provider modem. The synchronization negotiates a bandwidth within these boundaries.

As illustrated in FIG. 1, the DSL modem is in between the personal computer and service provider with both variable bandwidths on the connections to either of them.

A problem for the DSL modem boils down to having to select one of two possible USB data transfer modes, and aligning the USB bus bandwidth to the DSL line bandwidth to guarantee low-latency data transfer and no data loss. Moreover, at the same time it must be made sure that the 12 Mbps bandwidth on the USB is carefully distributed between all devices connected to the USB bus to prevent other devices from no longer functioning.

Devices choose one USB data transfer mode, according to the features of the device and its data. Low bit-rate devices with burst-like data select bulk transfer mode, whereas high bit-rate multimedia devices (e.g. camera's, speakers . . . ) select isochronous transfer mode.

Now, DSL modems can have both burst-like and multimedia data-transfer with varying bit-rates. Typically, DSL modems are used combined with other USB devices, which may require a high amount of bandwidth.

In a first option, the DSL modem always uses the isochronous transfer mode. From the DSL modem point of view, that transfer mode is a good option because of the low-latency and guaranteed bandwidth. But, if the DSL modem reserves a certain amount of guaranteed bandwidth, other devices on the USB bus have no longer access to this bandwidth and might stop functioning properly.

On the other hand, if the isochronous bandwidth requested by the DSL modem is not available on the USB bus, the modem cannot transfer its data over the USB bus.

The second option is to select bulk transfer mode, which is typically suited for low bandwidths. If the DSL line-rate is 8 Mbps, bulk transfer mode probably results in delayed data transfer and even in loss of data, because of the reduced likelihood of the bandwidth being available on the USB bus. In practice, this is only the case if there is no other device connected to the USB bus.

Prior art DSL modems select one of the two transfer modes. However, they prove to commonly result in either unsufficient available bandwidth on the USB bus, which causes the device not to function properly, or in excessive bandwidth reservation, which limits the number of USB devices that can function on one USB bus.

The invention concerns a modem for interconnecting a DSL line and a local bus and a method for establishing a data transfer mode for a modem, which allow to avoid such drawbacks.

To that effect, the invention provides a modem comprising a DSL interface adapted to send and receive data on the DSL line at a DSL bandwidth selected from a first set of bandwidths, and a local bus interface.

SUMMARY OF THE INVENTION

According to the invention, the local bus interface is adapted to operate at a local bus bandwidth selected from a second set of bandwidths so as to match the DSL bandwidth.

Preferably, the local bus interface is a USB interface that supports isochronous transfer at any bandwidth of the second set and bulk transfer mode.

With such a modem, it is possible to establish a well balanced transfer configuration both on the DSL line and on the local bus. The modem will not reserve more bandwidth on the local bus than necessary for accommodating a data flow which is actually expected from the DSL line, so that the bandwidth available for other devices connected to the same local bus is not reduced more than necessary. Quite clearly, the probability of such a modem being able to reserve the bandwidth it needs on the local bus is higher than with a conventional USB modem, which is only able to reserve one maximum bandwidth, no matter how much of this bandwidth is actually required for data transfer. If this conventional modem fails to reserve the desired bandwidth for isochronous transfer, it can only operate in bulk transfer mode, i.e. bandwidth for forwarding data received from the DSL line may or may not be available on the USB bus.

For simplicity's sake, the two sets of bandwidths are formed of a plurality of discrete predefined bandwidth amounts.

In that case, a local bus bandwidth supporting the same payload data rate as a given DSL bandwidth need not always exist in that second set. A local bus bandwidth will then be said to match the DSL bandwidth if it is the lowest bandwidth from the second set that has a payload data rate at least equal to that of the DSL bandwidth.

If the DSL bandwidth is low, the overhead involved with reserving a corresponding amount of bandwidth for isochronous transfer on the local bus is relatively high, and the probability of not being able to forward data received from the DSL line on the local bus using bulk transfer mode is low. Therefore, the efficiency of the modem may be increased if its USB interface is adapted to operate in bulk transfer mode if the DSL bandwidth is below a predefined non-zero threshold and in isochronous transfer mode if the DSL bandwidth is above said threshold.

In order to shorten the procedure of establishing a communication between the modem and a service provider at a remote end of the DSL line, it is advantageous to have storage means at the modem for storing data representative of at least one of a local bus bandwidth amount and a DSL bandwidth amount assigned to a service accessible by said DSL line from said service provider. In this way, there is no more need to transfer this information from the service provider to the modem during set-up of the communication. Preferably, means may be provided in the modem that allow the service provider to download information specifying this at least one bandwidth amount to the modem.

The invention also relates to a method for establishing a data transfer mode for a modem interconnecting a DSL line and a local bus, preferably a modem as defined above, comprising the steps of a) selecting at least one of a desired DSL bandwidth and a desired local bus bandwidth from first and second sets of bandwidths according to a desired type of service to be accessed via said DSL line,
b) attempting to synchronize the DSL line to the desired DSL bandwidth,
c) attempting to reserve the desired local bus bandwidth on the local bus,
d) when the attempts have succeeded, transferring data between the DSL line and the local bus.

In step a), at least one of the two desired bandwidths is preferably selected based on an information specifying a default bandwidth amount for the desired service which is stored at the modem. This specified bandwidth amount may correspond exactly to a bandwidth from one of said sets; if it does not, the selected desired bandwidths will be the lowest bandwidth from each set whose payload data rate is above the payload data rate corresponding to the specified bandwidth. Thus, it is possible for a service provider to download information specifying default bandwidth to the modem without having to know exactly the bandwidths that maybe available in the two sets.

Preferably, the method further comprises a step of selecting one of the desired bandwidths based on the other bandwidth such that the desired local bus bandwidth is the lowest bandwidth from said second set that has a payload data rate at least equal to that of the desired DSL bandwidth. This step increases the flexibility of the method greatly in case that one of steps b) or c) fails and has to be retried with a decreased desired bandwidth.

According to a first embodiment of the method, the step c) of attempting to reserve the desired local bus bandwidth is carried out before step b) of attempting to synchronize the DSL line.

In this embodiment, if step c) fails, a lower desired local bus bandwidth is selected from the second set, and step c) is repeated. In this way, the method will finally succeed to reserve the maximum amount of bandwidth that is available on the local bus at a given time.

If step c) fails, even for the lowest bandwidth of the second set, bulk transfer mode may be selected for the local bus. If this done, there is no guarantee that it will be possible to forward all data received from the DSL line to the local bus. In this way, at least a best-effort-type of service is provided.

Further, according to this embodiment, the above-described step of selecting one of the desired bandwidths based on the other bandwidth is applied to the DSL bandwidth after step c) was successful. Thus, the selected DSL bandwidth will match the isochronous bandwidth that was successfully reserved on the local bus, whereby it is made sure that the amount of data the modem receives from the DSL line will never be more than what it is able to forward on the local bus.

According to a second embodiment, step c) is carried out after step b).

In this embodiment, if step b) fails, e.g. due to bad quality of the DSL line, a lower desired DSL bandwidth is selected for the first set, and step b) is repeated. In this way, the DSL line will finally be synchronized to the best available DSL bandwidth for the desired service.

If this best available bandwidth is below a specified non-zero threshold, it may not be worth while to reserve isochronous bandwidth on the local bus, and bulk transfer mode may be set for the local bus, instead.

Bulk transfer mode also preferably is set if all attempts to reserve isochronous bandwidth on the local bus fail.

In this second embodiment, the step of selecting one of the desired bandwidths based on the other bandwidth is preferably applied to the local bus bandwidth after the step b) of synchronizing the DSL line was successful. In this way, it is made sure that the modem will not occupy more isochronous bandwidth on the local bus than necessary for forwarding all the data it receives, regardless of what bandwidth the DSL was finally synchronized to.

BRIEF DESCRIPTION OF THE DRAWINGS

The invention will be better understood and illustrated by means of the following embodiments examples, in no way limitative, with reference to the appended Figures on which:

FIG. 2 gives a flow-graph for a first dynamic selection way according to the method of the invention ("aggressive" selection);

and FIG. 3 gives a flow-graph for a second dynamic selection way according to the method of the invention ("friendly" selection).

DETAILED DESCRIPTION OF THE PREFERRED EMBODIMENTS

Figure 1:
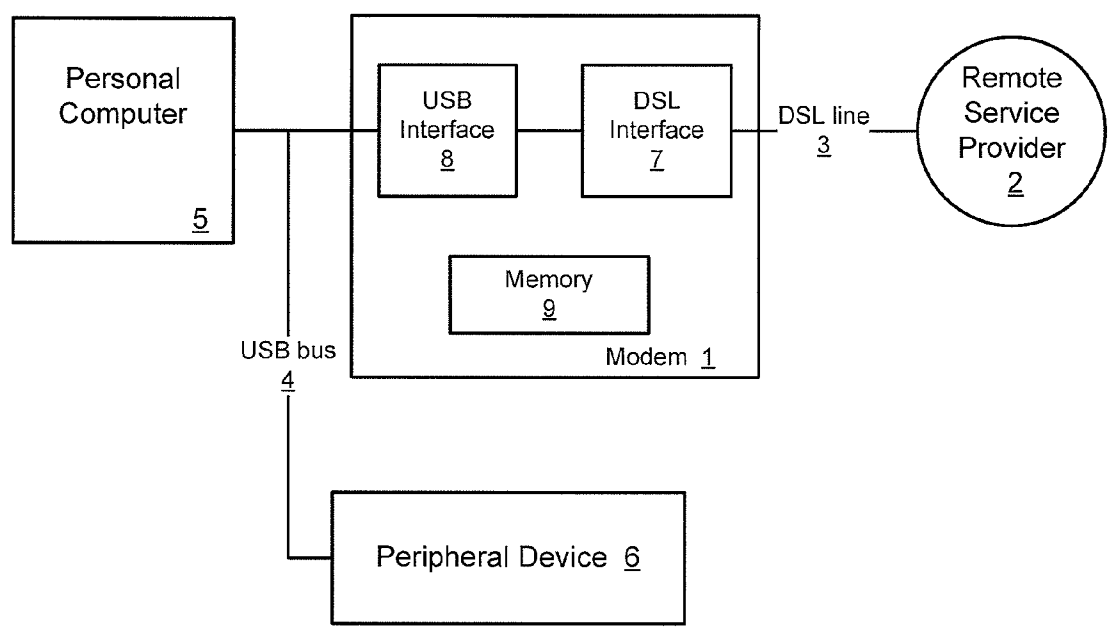
FIG. 1 shows a general DSL modem topology.

In FIG. 1, a modem 1 is shown which is connected, on the one hand, to a remote service provider 2 via a DSL line 3 and, on the other hand, to a local network comprising a USB bus 4, a personal computer 5 and one or more peripheral devices 6 that may occupy a variable proportion of the bandwidth of the USB bus 4.

The modem 1 has a DSL interface 7 connected to the DSL line 3 and a USB interface 8 connected to the USB bus 4. The DSL interface 7 supports a first set of discrete bandwidth values for communicating with the DSL line. The USB interface 8 supports synchronous transfer mode with a bandwidth selected from a second set of discrete bandwidth values, and bulk transfer mode. The modem 1 further comprises a memory 9 which, in the Figure, is shown as an integral part of the modem, but which may be implemented just as well within the computer 5, for storing default bandwidth values of the DSL line and/or the USB bus for accessing the service provider 2. These default bandwidths are set according to a maximum data rate at which the service provider 2 can provide the desired service. It will be assumed that the service is operable at lower data rates, too. The default bandwidth values in memory 9 may be entered by a user of the computer 5, or they may be downloaded from the service provider 2.

Two embodiments of a method for establishing a data transfer mode using the modem 1, referred to as "aggressive" and "friendly" algorithm, will be described in the following. The "aggressive" algorithm is particularly appropriate if the service to be accessed requires high data rates that will occupy a substantial portion of the total bandwidth of the USB bus 4. The "friendly" algorithm is more appropriate for accessing a service having moderate bandwidth requirements. The modem 1 may be adapted to carry out only one of the two algorithms, or to select one of the two according to the bandwidth requirements of the desired service that are stored in memory 9.

A/ First Embodiment

"Aggressive" Dynamic Transfer Mode and Bandwidth Selection

Briefly, the "aggressive" bandwidth selection algorithm (FIG. 2) will reserve a specified amount of USB bandwidth for a desired service or as much of this bandwidth as possible, and will then synchronize the DSL line to a bandwidth matching that reserved on the USB bus 4. If the bandwidth required for the desired service on the USB bus 4 is 3.5 Mbps or less, no isochronous bandwidth will be reserved at all, but bulk transfer mode will be used. If the required bandwidth is above 3.5 Mbps, and if no isochronous bandwidth can be reserved on the USB bus 4, bulk transfer mode will be used too, which is a best-effort mode and will always provide some level of data transfer.

In detail, the "aggressive" bandwidth selection algorithm uses two input parameters that are stored in memory 9 and that may be set by the service provider:

- MAXUSB: the default maximum USB bandwidth the algorithm will try to reserve in isochronous mode
- MAXDSL: the default maximum DSL bandwidth the algorithm will try to synchronize the DSL line. This parameter is useful in case the set of configurations (alternate settings) has a maximum isochronous bandwidth and the maximum DSL bandwidth will be balanced to this value.

MAXUSB and MAXDSL are bandwidths from the two sets of bandwidths supported by the modem. MAXUSB and MAXDSL match each other; i.e. they have identical payload data rates, or MAXUSB is the lowest supported bandwidth on the USB bus 4 that has a higher payload data rate than MAXDSL. MAXDSL is at least equal to a minimum bandwidth to which the DSL line 3 can be synchronized.

After starting the PC 5 or connecting the modem 1 to the USB bus 4 in step S1, the MAXUSB and MAXDSL values will be retrieved from storage 9 in step S2. The memory 9 may be the system registry of the computer, e.g. in an "INI" type file of a "Windows" PC.

MAXUSB stands for a desired USB bandwidth which the modem 1 will reserve on the USB bus 4, if possible.

In step S3, the MAXUSB parameter is compared to a threshold value of 3.5 Mbps. If it is lower, i.e. if the bandwidth requirements of the desired service are low, the method branches to step S4, in which bulk transfer mode is set for the USB. This is because for 3.5 Mbps and below, bulk transfer mode is the friendliest for the USB bus, i.e. leaves more bandwidth for the devices 6 than synchronous transfer mode.

Then, the DSL line is synchronized. To this effect, Y=MAXDSL is selected as a desired bandwidth for the DSL line in step S5, and an attempt to synchronize to the desired bandwidth Y is carried out in S6. Step S7 checks whether the attempt was successful. If yes, the procedure is finished. If no, the attempt of S6 is repeated. If it fails a predetermined number of times—this predetermined number should be greater than one, since synchronization does not always succeed at the first attempt—it must be expected that e.g. due to bad quality of the DSL line 3, operation at the desired bandwidth is not possible, and another bandwidth from the first set of bandwidths is selected as a new desired bandwidth in D8. If this is not possible, no DSL communication can be established, and the procedure ends; otherwise, the procedure reverts to S6.

If, on the other hand, MAXUSB is found to be above 3.5 Mbps in S3, MAXUSB will be set as the desired bandwidth X for the USB 4 in step S9 and a request to reserve this amount of bandwidth in isochronous transfer mode will be launched in step S10.

In step S11, the modem checks whether the bandwidth request was granted. If it was not granted, the modem will check in step S12 whether there are lower isochronous bandwidth modes than the one requested in step S6 in the second set. If the answer is no, the modem will give up further attempts to reserve isochronous bandwidth and will branch to S4 so as to set bulk transfer mode for the USB bus 4 and to synchronize the DSL line 3 to MAXDSL, if possible.

If lower isochronous bandwidth modes are found to exist in step S12, the modem will select the bandwidth of the highest one of these lower isochronous bandwidth modes as the new desired bandwidth X in step S13 and will revert to step S10.

If the request for the desired bandwidth X is found successful in step S11, the modem will in step S14 select a DSL bandwidth Y from the first group that matches the granted USB bandwidth X, i.e. which achieves the same or a somewhat lesser payload data rate, and will try to synchronize the DSL line 3 to this bandwidth in step S5.

If the DSL line would synchronize to a higher bandwidth than X, there would be a risk of some downstream data being lost because of the bandwidth mismatch.

During the synchronization attempt of step S15, a minimum DSL rate is reported from the service provider 2 to the modem 1.

If the DSL line synchronization of step S15 fails, step S17 checks whether this minimum DSL rate is above the selected bandwidth Y. If yes, the procedure branches to step S4; if no, a further synchronization attempt is carried out. If it fails repeatedly, a lower DSL rate from the first set is selected for Y in step S18 before returning to S15.

If DSL line synchronization succeeds to the requested bandwidth Y as selected in S14, the DSL line is balanced with the USB guaranteed bandwidth and the procedure ends (S20). If the synchronization succeeds with a lower DSL bandwidth, i.e. if step S18 was carried out at least once before the synchronization was successful, the amount of bandwidth reserved on the USB may be more than what is necessary to forward download data arriving on the DSL line. The procedure therefore checks (S21) whether the DSL line synchronization is below or equal to 3.5 Mbps. If yes, bulk transfer mode is set in step S22. This mode is friendly to other devices and still assures data transfer if bandwidth is available on the USB bus. If no, step S23 checks whether an isochronous transfer mode having a bandwidth which is less than the actually reserved bandwidth and which matches the DSL bandwidth Y is available in the second set. If yes, this matching mode is set for the USB in step S24, if no, the procedure ends and the system will operate using the bandwidth X as reserved in step S10.

B/ Second Embodiment

“Friendly” Dynamic Transfer Mode and Bandwidth Selection

Briefly, the “friendly” selection algorithm (FIG. 3) will start with bulk transfer mode selected and start DSL line 3 synchronization. The algorithm will stay with bulk transfer mode until data is transferred (depends on the protocol configuration of the device). If data is transferred, it will request isochronous bandwidth if the DSL line 3 is synchronized to a bandwidth above 3.5 Mbps. If the bandwidth is not granted because not available on the USB bus 4, the algorithm will stay with bulk transfer mode to provide best-effort data transfer.

The “friendly” bandwidth selection algorithm illustrated in FIG. 3 uses the same two input parameters MAXUSB, MAXDSL that were already defined above relating to the “aggressive” algorithm.

The initial steps S'1, S'2 of the “friendly” algorithm are the same as steps S1, S2 explained above.

Subsequent steps S'3 to S'7 for synchronizing the DSL line are the same as steps S4 to S8 of the “aggressive” algorithm.

When the DSL line is synchronized, the modem waits for data transfer to begin (S'8). If data is transferred up- or downstream (e.g. PPP connection is connected), the algorithm will check the bandwidth to which the DSL line 3 is synchronized (S'9) and will keep using bulk transfer mode if the synchronized DSL line bandwidth is below or equal to 3.5 Mbps. Only if the DSL bandwidth is higher than 3.5 Mbps, the algorithm will try to select a USB bandwidth from the second set that matches the DSL bandwidth and to reserve it. In detail, it checks in step S'11 whether there is an isochronous mode in the second set that has a greater bandwidth than the synchronized bandwidth Y of the DSL line. If there is no such mode, bulk transfer mode has to be used (S'10). If such a mode exists, the lowest one of these, i.e. the matching mode, is selected in step S'12. If a request for this USB bandwidth (S'13) is not granted in step S'14, bulk transfer mode has to be used (S'10). There is no guarantee then that there will be no loss of data, but at least a best effort service is provided. If the bandwidth is granted, the data will be transferred using isochronous transfer mode with the requested bandwidth X in step S'15. The modem will stay in this mode as long as data transmission continues. When transfer is finished (S'16), the modem will switch back to bulk mode for the USB (S'17) and will return to step S'8 where it waits for the data transfer to resume, until the DSL connection is finished.

The “aggressive” selection algorithm has the advantage that it will try to reserve bandwidth for high-bandwidth multimedia content delivery over DSL. If there is less bandwidth available on the USB bus than requested, the DSL synchronization will try to balance the bandwidth settings to keep an optimal DSL service. If the bus is congested, the algorithm will fall back to bulk transfer mode as a best-effort mode which will still provide some level of data-transfer.

The “friendly” selection algorithm is perfectly suited for low-bandwidth DSL services (e.g. traditional internet access) and tries only to reserve bandwidth if needed. This allows other devices to get access to bandwidth on the USB bus when the DSL modem does not consume bandwidth for data transfer.

Both algorithms are complementary, and the combination of both provides a dynamic and efficient USB bandwidth and transfer mode selection.

The invention claimed is:

1. A modem for interconnecting a DSL line and a local bus, said local bus comprising a first and a second data transfer mode, which modem comprises a DSL interface adapted to send and receive data on the DSL line at a DSL bandwidth selected from a first set of bandwidths, and a local bus interface, wherein the local bus interface is adapted to operate at a local bus bandwidth selected from a second set of bandwidths so as to match the DSL bandwidth, and is adapted to select the first data transfer mode if said local bus bandwidth is below a specified nonzero threshold even if said second data transfer mode could be used with said local bus bandwidth, to select the first data transfer mode if said local bus bandwidth is above said threshold and if said second data transfer mode cannot be used with said local bus bandwidth.

2. The modem according to claim 1, wherein each set is formed of a plurality of discrete predefined bandwidth amounts.

3. The modem according to claim 2, wherein the local bus bandwidth that matches the DSL bandwidth is the lowest bandwidth from said second set that has a payload data rate at least equal to that of the DSL bandwidth.

4. The modem according to claim 1, wherein the local bus interface is a USB interface.

5. The modem according to claim 4, wherein the USB interface is adapted to operate in bulk transfer mode if the DSL bandwidth is below a predefined non-zero threshold and in isochronous transfer mode if the DSL bandwidth is above said threshold.

6. The modem according to claim 1, wherein it comprises storage means for storing data representative of at least one of a local bus bandwidth amount and a DSL bandwidth amount assigned to a service accessible by said DSL line.

7. A method for establishing a data transfer mode for a modem interconnecting a DSL line and a local bus, said local bus comprising a first and a second data transfer mode, comprising the steps of a) selecting at least one of a desired DSL bandwidth and a desired local bus bandwidth from first and second sets of bandwidths according to a desired type of service to be accessed via said DSL line, b) attempting to reserve the desired local bus bandwidth on the local bus, c) if said local bus bandwidth is below a specified nonzero threshold, selecting the first data transfer mode even if said second data transfer mode could be used with said local bus bandwidth; if said local bus bandwidth is above said threshold and said second data transfer mode can be used with said local bus bandwidth, selecting the second data transfer mode; and, if said local bus bandwidth is above said threshold and said second data transfer mode cannot be used with said local bus bandwidth, selecting the first data transfer mode, d) attempting to synchronize the DSL line to the desired DSL bandwidth, and e) when the attempts have succeeded, transferring data between the DSL line and the local bus.

8. The method of claim 7, wherein each set is formed of a plurality of discrete predefined bandwidth amounts.

9. The method of claim 8, comprising the step of selecting one of the desired bandwidths based on the other bandwidth such that the desired local bus bandwidth is the lowest bandwidth from said second set that has a payload data rate at least equal to that of the desired DSL bandwidth.

10. The method of claim 7, wherein at least one of the desired bus bandwidths is selected based on a specified bandwidth amount for the desired service stored at the modem.

11. The method of claim 7, wherein if the second data transfer mode is selected and if step d) fails, a lower desired local bus bandwidth is selected from the second set, and step d) is repeated.

12. The method of claim 11, wherein if step d) fails and no lower desired local bus bandwidth can be selected from the second set, the first data transfer mode is selected for the local bus.

13. A method for establishing a data transfer mode for a modem interconnecting a DSL line and a local bus, said local bus comprising a first and a second data transfer mode, comprising the steps of a) selecting the first data transfer mode if a local bus bandwidth is below specified nonzero threshold said selection of the first data transfer mode being independent of the local bus bandwidth, b) selecting at least one of a desired DSL bandwidth and a desired local bus bandwidth from first and second sets of bandwidths according to a desired type of service to be accessed via said DSL line, c) attempting to reserve the desired local bus bandwidth on the local bus, d) attempting to synchronize the DSL line to the desired DSL bandwidth, and e) when the attempts have succeeded, transferring data between the DSL line and the local bus.

14. The method of claim 13, wherein, if said transfer has succeeded and if said local bus bandwidth is above a specified nonzero threshold, selecting the second data transfer mode.

15. The method of claim 13, wherein, if said local bus bandwidth is not granted, selecting the first data transfer mode.

16. The method according to claim 13, wherein said local bus is an USB bus, said first data transfer mode is a Bulk transfer mode and said second data transfer mode is an Isochronous transfer mode.

17. The method according to claim 7, wherein said local bus is an USB bus, said first data transfer mode is a Bulk transfer mode and said second data transfer mode is an Isochronous transfer mode.

* * * * *